(12) United States Patent
Bhat et al.

(10) Patent No.: US 11,353,723 B2
(45) Date of Patent: Jun. 7, 2022

(54) SACCADE DETECTION AND ENDPOINT PREDICTION FOR ELECTRONIC CONTACT LENSES

(71) Applicant: Tectus Corporation, Saratoga, CA (US)

(72) Inventors: Abhishek Deepak Bhat, Sunnyvale, CA (US); Joseph Czompo, San Jose, CA (US); Ramin Mirjalili, San Jose, CA (US); Michael West Wiemer, San Jose, CA (US); Erik Anderson, San Bruno, CA (US)

(73) Assignee: Tectus Corporation, Saratoga, CA (US)

( * ) Notice: Subject to any disclaimer, the term of this patent is extended or adjusted under 35 U.S.C. 154(b) by 137 days.

(21) Appl. No.: 16/670,643

(22) Filed: Oct. 31, 2019

(65) Prior Publication Data

US 2021/0132410 A1  May 6, 2021

(51) Int. Cl.
*G02C 7/04* (2006.01)
*G02B 27/00* (2006.01)
*G02B 1/04* (2006.01)
*G02C 7/08* (2006.01)
*G02B 27/01* (2006.01)

(52) U.S. Cl.
CPC ............. *G02C 7/049* (2013.01); *G02B 1/043* (2013.01); *G02B 27/0093* (2013.01); *G02C 7/047* (2013.01); *G02C 7/083* (2013.01); *G02B 27/0101* (2013.01); *G02C 7/048* (2013.01)

(58) Field of Classification Search
CPC ........ G02C 7/049; G02C 7/083; G02C 7/047; G02C 7/048; G02B 1/043; G02B 27/0093; G02B 27/0101
See application file for complete search history.

(56) References Cited

U.S. PATENT DOCUMENTS

| | | | |
|---|---|---|---|
| 7,056,620 B2 | 6/2006 | Krasnov | |
| 8,786,675 B2 | 7/2014 | Deering | |
| 9,276,292 B1 | 3/2016 | Mackenzie | |
| 9,368,283 B2 | 6/2016 | Wright | |
| 9,887,429 B2 | 2/2018 | Shih | |
| 2017/0068312 A1* | 3/2017 | Mallinson | G06F 3/015 |

(Continued)

OTHER PUBLICATIONS

Bahill, et al., "The Main Sequence, A Tool for Studying Human Eye Movements," Mathematical Biosciences 24, 191-204 (1975).

(Continued)

*Primary Examiner* — Stephone B Allen
*Assistant Examiner* — Gabriel A Sanz
(74) *Attorney, Agent, or Firm* — Fenwick & West LLP (57) ABSTRACT

Operation of an electronic contact lens takes into account saccadic motion of the eye and reduced visual perception during saccades (saccadic suppression). The user's eye motion is tracked, and onset of a saccade is detected based on the eye's motion. For example, saccades may be detected when the eye's acceleration or jerk exceeds a threshold. The endpoint of the saccade is then predicted in real-time while the saccade is still occurring. This may be the temporal endpoint (i.e., when the saccade ends) and/or the positional endpoint (i.e., the eye position at the end of the saccade). Operation of the electronic contact lens is adjusted based on the predicted endpoint.

15 Claims, 12 Drawing Sheets

(56) References Cited

U.S. PATENT DOCUMENTS

| | | | | |
|---|---|---|---|---|
| 2018/0335836 A1* | 11/2018 | Miller | ............... | G02B 27/017 |
| 2019/0033618 A1 | 1/2019 | Choi | | |
| 2019/0204913 A1* | 7/2019 | Sarkar | ............... | G06F 3/013 |
| 2019/0324276 A1* | 10/2019 | Edwin | ............... | G09G 5/003 |
| 2019/0339770 A1* | 11/2019 | Kurlethimar | ......... | G06F 3/0346 |
| 2019/0354174 A1* | 11/2019 | Young | ............... | G06F 1/163 |
| 2021/0089119 A1* | 3/2021 | Riguer | ............... | H04N 19/17 |

OTHER PUBLICATIONS

Bahill, et al., "The Trajectories of Saccadic Eye Movements," Scientific American 240 (1), 108-117 (Jan. 1979).

Krekelberg, "Saccadic Suppression," Current Biology 20 (5), R228-R229.

\* cited by examiner

SACCADE DETECTION AND ENDPOINT PREDICTION FOR ELECTRONIC CONTACT LENSES

BACKGROUND

1. Technical Field

This disclosure relates generally to electronic contact lenses, for example contact lenses containing projectors that project images onto the user's retina.

2. Description of Related Art

Contact lenses that provide refractive vision correction are commonplace. Recently, there has been increased interest in contact lenses that perform functions other than just vision correction. In many of these applications, a contact lens may carry a payload for performing various functions. For example, a contact lens may contain a payload of one or more electrical components, such as projectors, imaging devices (imagers), sensors, coils, batteries, MEMS (micro-electro-mechanical systems), accelerometers and magnetometers, etc. These contact lenses may be referred to as electronic contact lenses.

However, contact lenses present some unique challenges. For example, they have a limited thickness and volume and they are inherently curved rather than planar. The placement of electrical components is further limited by the optical operation of the eye. Light enters the eye through the center of the contact lens, so opaque components placed in this region block light from entering the eye. Conversely, components that are intended to project light into the eye are positioned so that they have an optical path through this region into the eye. Furthermore, the power budget for components within the contact lens is limited. Similarly, the available data bandwidth to the contact lens is also limited, presenting additional challenges.

As a result, it can be challenging to operate electrical components in an electronic contact lens.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

One type of electronic contact lens includes a display that is mounted on the user's eye. For example, such a device may include a scleral contact lens and one or more small projectors (femtoprojectors) contained in the contact lens. The femtoprojectors project images onto the user's retina. Because the display is eye-mounted, the femtoprojectors move with the eye, and the position of images displayed by the femtoprojectors relative to the external environment are affected by the eye movement. For example, if the femtoprojector projects an image to a constant location on the retina while the eye is moving, then the image will appear to move relative to the external environment.

One type of eye motion is a saccade. Saccades are rapid eye movements that bring objects of interest onto the central, highly sensitive part of the retina. During each saccade, the image of the external environment moves rapidly across the retina. Saccadic suppression refers to the behavioral observation that healthy humans under normal circumstances do not perceive this motion. Saccades occur several times per second and may last from about 30 ms to 100 ms with rotations of about 1 degree to about 15 degrees, but larger saccades are possible. Saccades are the fastest type of eye motion, with angular accelerations as high as about 50,000 degrees/sec$^2$.

Operation of the electronic contact lens takes into account saccadic motion of the eye and saccadic suppression of perception by the brain. The user's eye motion is tracked, and onset of a saccade is detected based on the eye's motion. For example, saccades may be detected when the eye's acceleration or jerk exceeds a threshold. The endpoint of the saccade is then predicted in real-time while the saccade is still occurring. This may be the temporal endpoint (i.e., when the saccade ends) and/or the positional endpoint (i.e., the eye position at the end of the saccade).

In one approach, saccadic motion is modeled by a parameterized function. For example, the angular position of the eye may be modeled by a sigmoid function, where the amplitude, duration and temporal offset (i.e., start time) of the sigmoid are parameters. The actual motion of the user's eye is sampled, and the samples are used to determine the values of the parameters. Once the parameter values are determined, the endpoint may be predicted based on the parameterized function. The parameters may provide flexibility to account for differences between different users.

Operation of the electronic contact lens is adjusted based on the predicted endpoint. For example, components in the image pipeline (i.e., the femtoprojector and components leading to the femtoprojector) may be scaled back, idled or turned off during the saccade, taking advantage of the saccadic suppression to save power. This power savings may enable the enhanced operation of other components. For example, the sampling rate of eye tracking sensors or the data rate of wireless channels may be increased during the saccade.

The predicted eye position at the end of the saccade may also be used. For example, rather than calculating images that would have been displayed by the femtoprojector during the saccade (which are images that would not be perceived due to saccadic suppression), the system may instead calculate and/or preload the image to be displayed at the end of the saccade. That image might be in the user's peripheral vision at the beginning of the saccade but at the center of the user's visual field after the saccade. The time during the saccade may be used to increase the resolution of the image in accordance with the shift from periphery to center of the user's visual field. As another example, some components may require some time to adjust to the new eye position after the fast saccadic motion. These components may be initialized or primed using synthetic inputs during the saccade, so that the component will already be adapted when the saccade ends, rather than just beginning adaptation at that point.

Figure 1A:
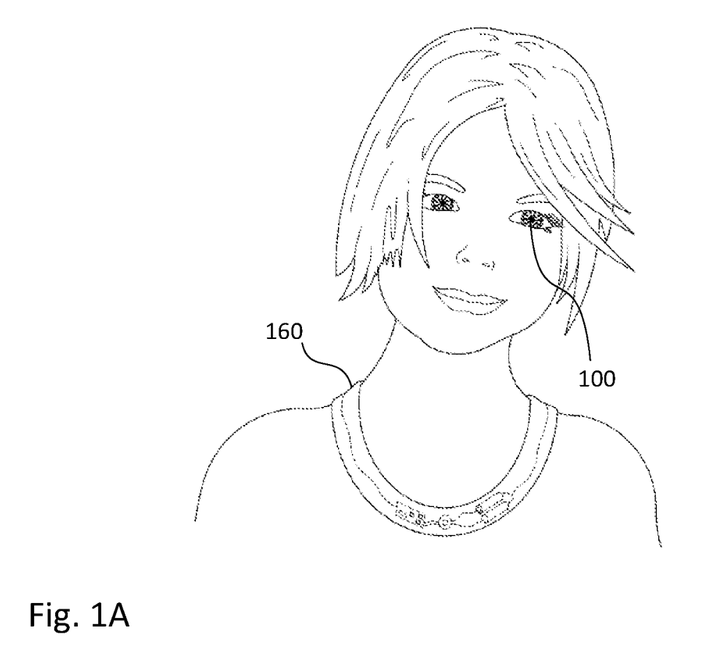
FIG. 1A shows a user wearing a display mounted in a contact lens.
Figure 1B:
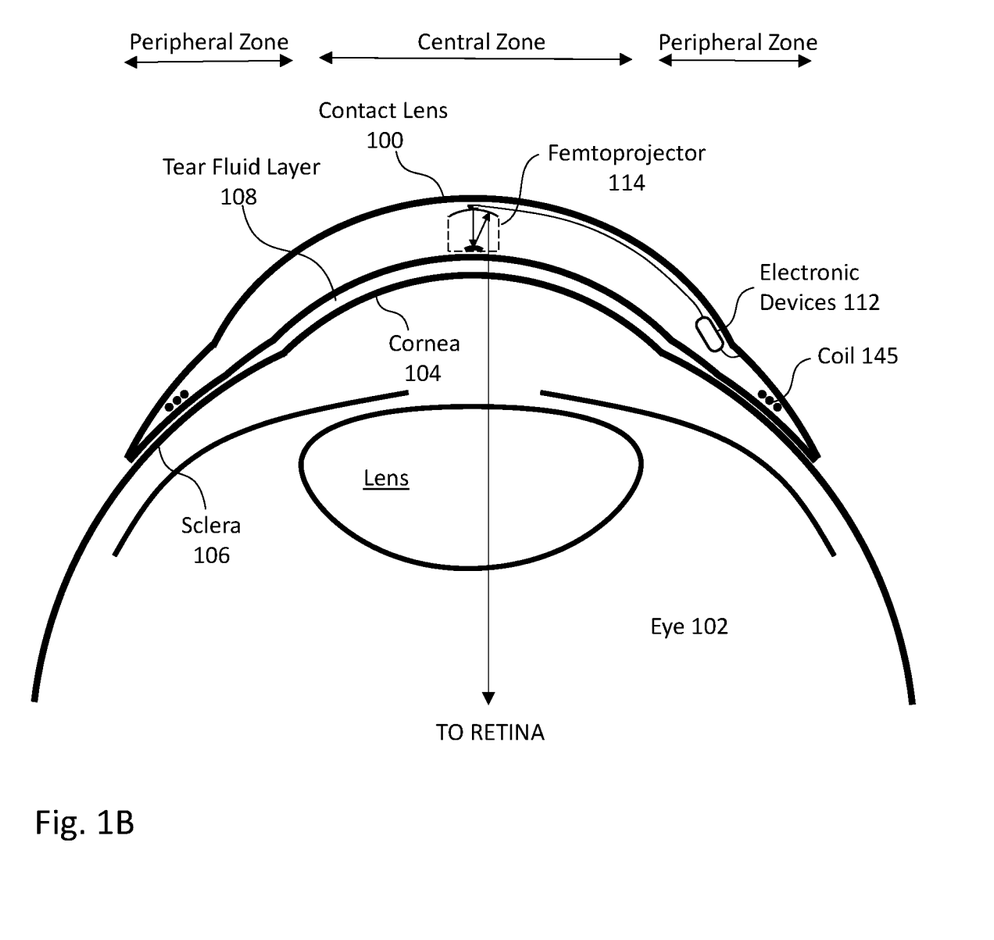
FIG. 1B shows a cross sectional view of the electronic contact lens mounted on the user's eye.

Further details are provided using an eye-mounted display as an example of an electronic contact lens, although it should be understood that other types of electronic contact lenses may also take advantage of saccade detection and/or endpoint prediction. FIG. 1A shows a user wearing a display mounted in a scleral contact lens 100. FIG. 1A also shows an accessory necklace 160, which is discussed with FIG. 2. FIG. 1B shows a cross sectional view of the scleral contact lens 100 mounted on the user's eye. Scleral contact lenses are designed to not move around on the wearer's eye. The eye 102 includes a cornea 104 and a sclera 106. The scleral contact lens 100 is supported by the sclera 106 and vaults over the cornea 104. A tear fluid layer 108 may be formed between the contact lens 100 and the cornea 104. Oxygen permeates through the contact lens 100 to the cornea 104.

The contact lens 100 contains payload(s). For example, the payload(s) may include electronics, including electronics that require a power source such as a battery or a coil that is inductively powered. In the example of FIG. 1, the payloads include a small projector that projects images onto the wearer's retina (referred to as a femtoprojector 114), and the corresponding electronics 112 to operate the femtoprojector. These may be powered by a receiver coil 145 around the periphery of the contact lens and/or a battery contained in the contact lens. The femtoprojector 114 may include an LED frontplane with an LED array, an ASIC backplane with electronics that receives the data to drive the LED frontplane, and optics to project light from the LED array onto the retina. The femtoprojector 114 preferably fits into a 2 mm by 2 mm by 2 mm volume or even into a 1 mm by 1 mm by 1 mm volume.

The femtoprojector 114 is positioned over the cornea since it projects images onto the retina. The electronics 112 may be positioned away from the cornea, as shown in FIG. 1B. For convenience, the contact lens 100 is divided into a central zone and a peripheral zone. The central zone overlaps the cornea 104. The area outside the cornea is part of the peripheral zone. In FIG. 1, the femtoprojector 114 is located within the central zone of the contact lens because it projects images into the user's eye, while the electronics 112 and coil 145 are located in the peripheral zone. Because people have eyes of different sizes and shapes, for convenience, the central zone may be defined as the 10 mm diameter center area of the contact lens (i.e., within 5 mm radius of the central axis of the contact lens). The diameter of the boundary between the cornea and the sclera is typically 10-12.5 mm. Payload components that project light onto the retina may be located within the central zone due to the required optical path. Conversely, payload components that do not project light onto the retina or otherwise interact with the retina may be located on the edge of the central zone or outside the central zone so that they do not block light from reaching the retina.

Other examples of powered payloads include sensors, imagers, and eye tracking components such as accelerometers, gyroscopes and magnetometers. Payloads may also include passive devices, such as a coil or antenna for wireless power or data transmission, capacitors or batteries for energy storage, and passive optical structures (e.g., absorbing light baffles, beam-splitters, imaging optics). The contact lens 100 may also contains multiple femtoprojectors, each of which projects images onto the user's retina.

The contact lens 100 moves with the user's eye 102 as the user's eye rotates in its socket. Because the femtoprojectors are mounted in the contact lens 100, they also move with the user's eye and project to the same region of the retina. Different femtoprojectors may project images with different resolutions. Some femtoprojector(s) may project high resolution images onto the fovea and other femtoprojector(s) may project lower resolution images onto peripheral regions of the retina. The images from different femtoprojectors may be overlapping, to form a composite image on the wearer's retina.

Figure 2:
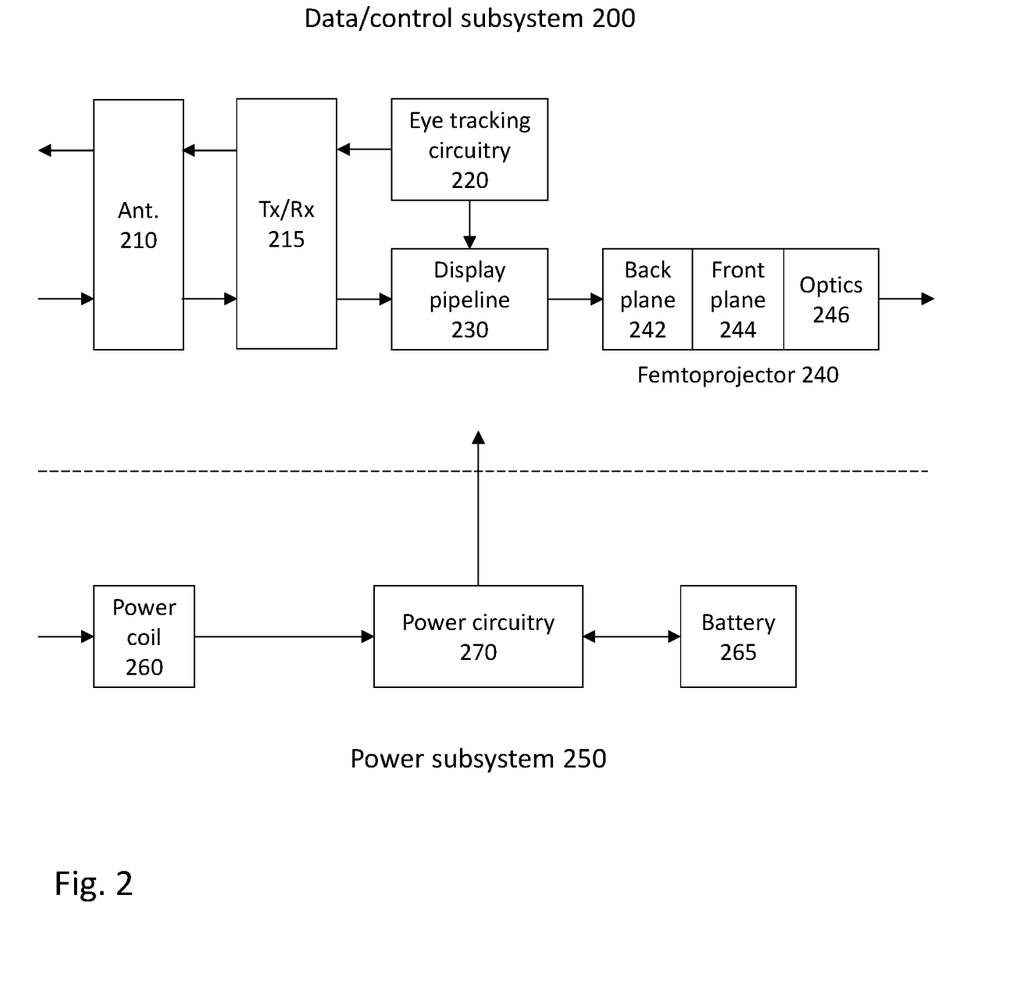
FIG. 2 is a functional block diagram of an eye-mounted display using an electronic contact lens.

FIG. 2 is a functional block diagram of an eye-mounted display using the scleral contact lens described above. The display can be divided into a data/control subsystem 200 and a power subsystem 250.

In this example, the receive path of the data/control subsystem 200 includes an antenna 210, receiver circuitry 215, a data pipeline (display pipeline 230), and a femtoprojector 240. Data from an external source is wirelessly transmitted to the display and received via the antenna 210. The receiver circuitry 215 performs the functions for receiving the data, for example demodulation, noise filtering, and amplification. It also converts the received signals to digital form. The pipeline 230 processes the digital signals for the femtoprojector 240. These functions may include decoding and timing. The processing may also depend on other signals generated internally within the contact lens, for example eye tracking sensors 220 or ambient light sensing. The femtoprojector 240 then projects the corresponding images onto the wearer's retina. In this example, the femtoprojector 240 includes a CMOS ASIC backplane 242, LED frontplane 244 and projection optics 246.

The data/control subsystem 200 may also include a back channel through transmitter circuitry 215 and antenna 210. For example, the contact lens may transmit eye tracking data, control data and/or data about the status of the contact lens.

Power may be received wirelessly via a power coil 260. This is coupled to circuitry 270 that conditions and distributes the incoming power (e.g., converting from AC to DC if needed). The power subsystem 250 may also include energy storage devices, such as batteries 265 or capacitors.

In addition to the components shown in FIG. 2 (which are on-lens), the overall system may also include components that are outside the contact lens (i.e., off-lens). For example, head tracking and eye tracking functions may be performed partly or entirely off-lens. The data pipeline may also be performed partially or entirely off-lens. Each of the arrows on the lefthand side of FIG. 2 also connects to an off-lens component. The power transmitter coil is off-lens, the source of image data and control data for the contact lens display is off-lens, and the receive side of the back channel is off-lens.

There are many ways to implement the different system functions. Some portions of the system may be entirely external to the user, while other portions may be worn by the user in the form of a headpiece or glasses. For example, see U.S. patent application Ser. No. 16/530,949, "Headgear Providing Inductive Coupling to a Contact Lens," (41898), which is incorporated by reference in its entirety. Components may also be worn on a belt, armband, wrist piece, necklace, or other types of packs. FIG. 1A shows an example where some functionality is implemented in a necklace 160 worn by the user. In this example, the necklace 160 includes a wireless transmitter that communicates with the eye-mounted display 100.

Figure 3:
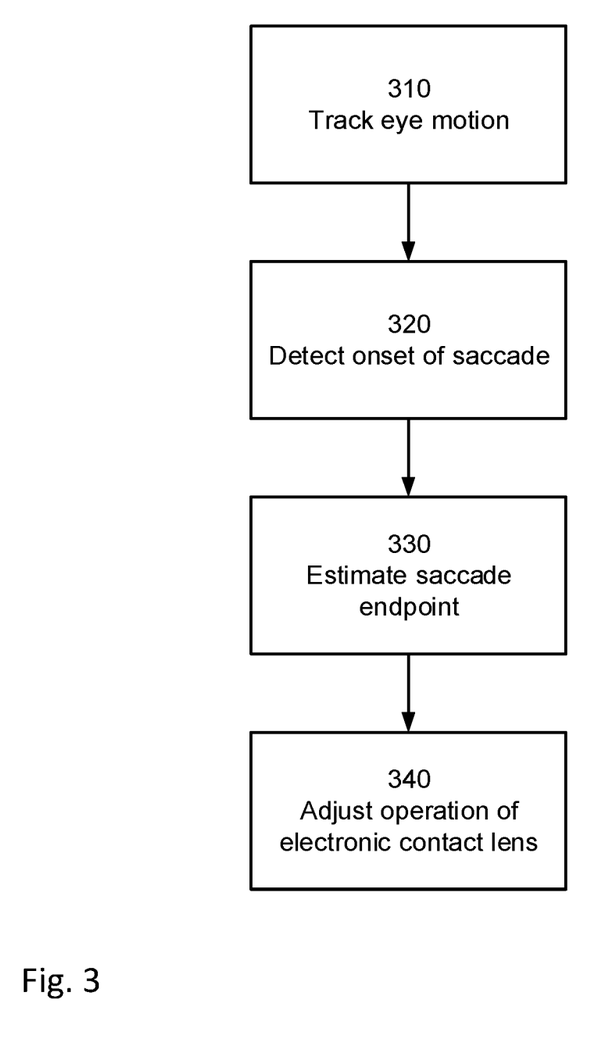
FIG. 3 is a flow diagram of a method for operating an electronic contact lens, accounting for saccadic motion.

FIG. 3 is a flow diagram of a method for operating an eye-mounted display that takes into account saccadic motion of the eye and saccadic suppression by the brain. The user's eye motion is tracked 310, and onset of a saccade is detected 320 based on the eye's motion. For example, saccades may be detected when the eye's acceleration or jerk exceeds a threshold. The endpoint of the saccade is then predicted 330 in real-time while the saccade is still occurring. This may be the temporal endpoint (i.e., when the saccade ends) and/or the positional endpoint (i.e., the eye position at the end of the saccade). Operation of the electronic contact lens is adjusted 340 based on the predicted endpoint.

Figure 4A:
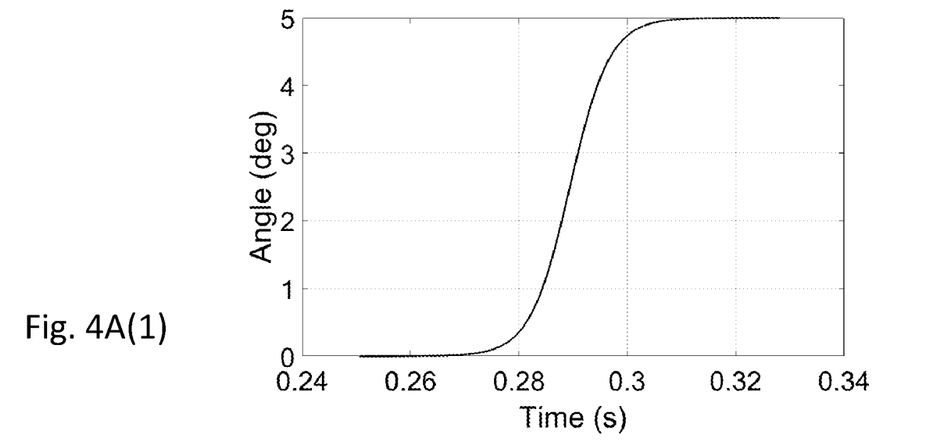
FIGS. 4A and 4B are graphs of angular position, speed and acceleration of the eye as a function of time, for simulated saccades of two different lengths.
Figure 4B:
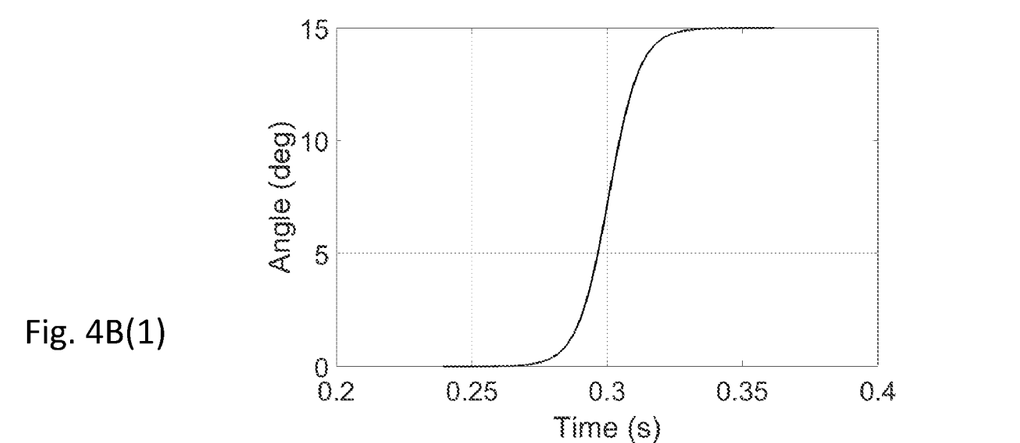

During saccadic motion, the angular position of the eye as a function of time has a shape that is approximately sigmoidal. FIGS. 4A and 4B are plots of angular position, speed and acceleration of the eye as a function of time, for simulated saccades of two different lengths. FIG. 4A shows a saccade where the eye rotates 5 degrees over approximately 40 ms. FIGS. 4A(1), 4A(2) and 4A(3) plot the angular position, speed and acceleration of the eye during this saccade, where these quantities are measured along the direction of motion for the saccade. FIG. 4B shows a saccade where the eye rotates 15 degrees over approximately 60 ms, with FIGS. 4B(1), 4B(2) and 4B(3) plotting the same quantities.

Figure 4C:
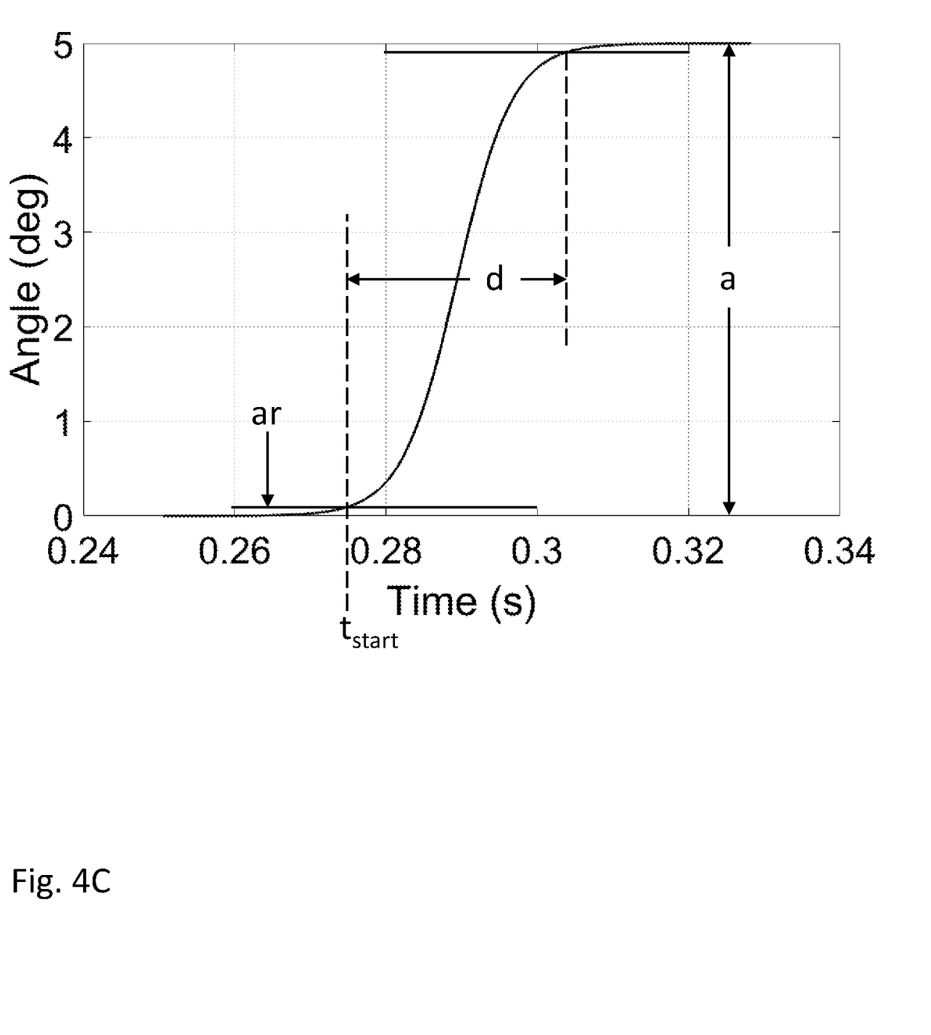
FIG. 4C shows variables used to define a saccadic motion.

Because saccades of different lengths have similar shapes, in one approach, the saccadic motion is modeled by a parameterized function. The different parameters account for different length saccades and may also account for variations between different individuals. In FIGS. 4A and 4B, the angular position θ of the eye is modeled by a sigmoid function, and the angular speed ω and acceleration a are the first and second derivatives of the sigmoid function. FIG. 4C shows a sigmoid function using the variables amplitude "a", duration "d", temporal offset "$t_{start}$" and starting point ratio "r." The amplitude "a" is the full amplitude of the sigmoid. If the sigmoid function is σ(t), then a=σ(∞)−σ(−∞). The duration "d" is the time for the sigmoid function to move from a value of (ar) to a value of (a(1−r)), assuming that the full sigmoid starts at 0 and ends at "a." In other words, if σ($t_{start}$)=ar and σ($t_{end}$)=a(1−r), then d=$t_{end}$−$t_{start}$. The starting point ratio "r" is selected to avoid the asymptotic ends of the sigmoid function. It may be set to a value in the the range of 0.1-1.0%, for example. The temporal offset "$t_{start}$" shifts the sigmoid function to the left or right in time.

This formulation based on the sigmoid function yields the following equations for the saccadic motion:

$$\theta(t) = a/q_1 \quad (1A)$$

$$\omega(t) = acq/q_1^2 \quad (1B)$$

-continued $$\alpha(t) = ac^2 q(q-1)/q_1^3 \quad (1C)$$

where $$c = \frac{2}{d} \cdot \ln\left(\frac{1}{r} - 1\right)$$

$$q = \exp\left\{-c\left(t - t_{start} - \frac{d}{2}\right)\right\}$$

$$q_1 = q + 1$$

In this formulation, the unknown variables are "a", "d", "$t_{start}$" and "r." The starting point ratio "r" may be selected a priori, for example as a configuration parameter. The amplitude "a" and duration "d" are not independent. There is a known relationship between saccade amplitude "a" and duration "d", also known as the saccadic main sequence. In one approach, the relationship is modelled as a linear function. More complex models may be used to allow for variations between people and across different circumstances. Other constraints may also be used. For example, there is also a known relationship between amplitude "a" and peak angular velocity, which may be calculated based on Eq. 1B. This may also be used to reduce the number of degrees of freedom. Using these constraints may reduce the number of independent parameters to two: "a" and "$t_{start}$". If "$t_{start}$" is estimated by other means, then the amplitude "a" is the single remaining parameter. The unknown parameters may be estimated by curve fitting to samples of the actual saccadic motion, such as samples of the angular acceleration, velocity or position.

Figure 5:
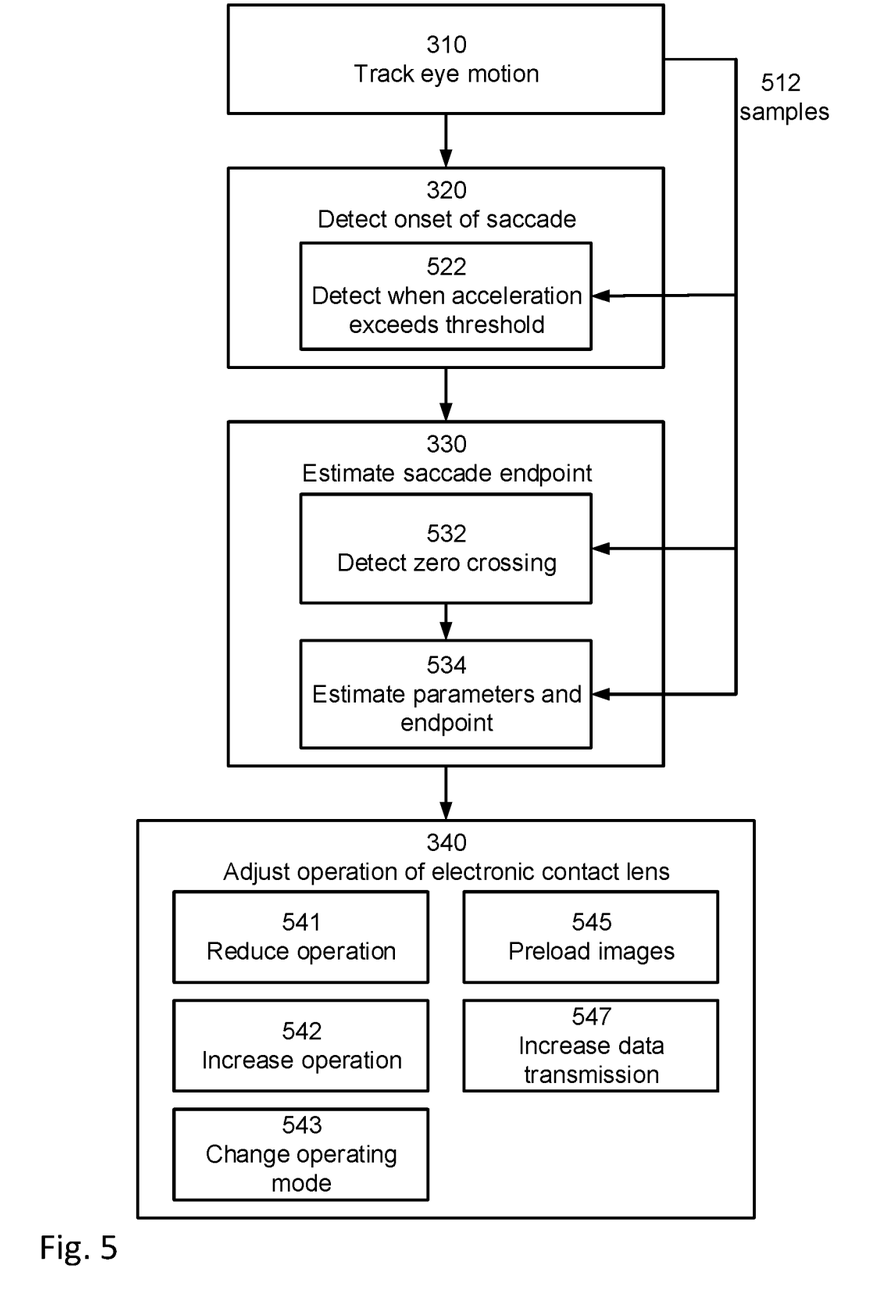
FIG. 5 is a flow diagram for predicting the endpoint of a saccade.

FIG. 5 shows the flow diagram of FIG. 3, with additional details for example implementations. Here, the eye tracking 310 produces samples 512 of the eye's angular acceleration. These samples may be based on measurements taken by sensors located in the electronic contact lens. For example, see U.S. patent application Ser. No. 16/005,379, "Contact Lens-Based Eye Tracking," (38838), which is incorporated by reference in its entirety. The sample rate may be low in order to reduce power consumption in the contact lens, not greater than one sample per millisecond for example.

Saccades are detected 320 when the angular acceleration and/or jerk exceeds 522 some threshold. Once the onset of a saccade is detected 320, the samples 512 are used to fit the parameterized function. Once the parameter values are determined, the endpoint of the saccade may be predicted based on the parameterized function. Using Eqs. 1 as an example, the angular acceleration samples may be used to find the value of parameter "a" that results in the best fit of Eq. 1C to the samples. From that, the saccade temporal endpoint may be estimated as $t_{end}$=$t_{start}$+d. The saccade position endpoint may be estimated as $\theta_{end}$=$\theta_{start}$+a(1−2r).

As shown in FIG. 4, the sigmoid acceleration curves are symmetric with respect to the midpoint of the saccade. A zero crossing marks the midpoint. In the approach of FIG. 5, the zero crossing of the acceleration curve is detected 532 and then the curve fit is performed 534 based on those samples. In this way, the curve fit is based on samples from the first half of the acceleration curve. This provides a good estimate for the second half of the acceleration curve due to the symmetry around the midpoint.

The initial curve fit and endpoint prediction may be refined as more samples are collected. In one variation, the second half of the acceleration curve is not assumed to be an exact mirror image of the first half. It may instead be a mirror image that is stretched in time and correspondingly reduced in amplitude (so that the total area under the curve remains the same) to provide an additional degree of freedom for the curve fitting.

FIG. 5 also shows different actions 340 that may be taken to adjust operation of the electronic contact lens, which is described in more detail below.

Figure 6A:
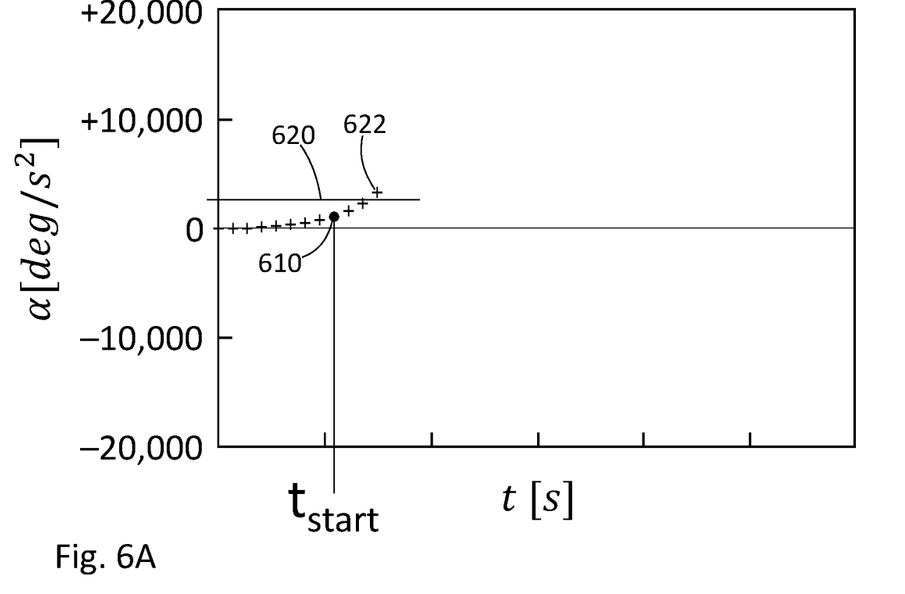
FIGS. 6A-6B are graphs of angular acceleration as a function of time, illustrating one embodiment of the flow diagram of FIG. 5.
Figure 6B:
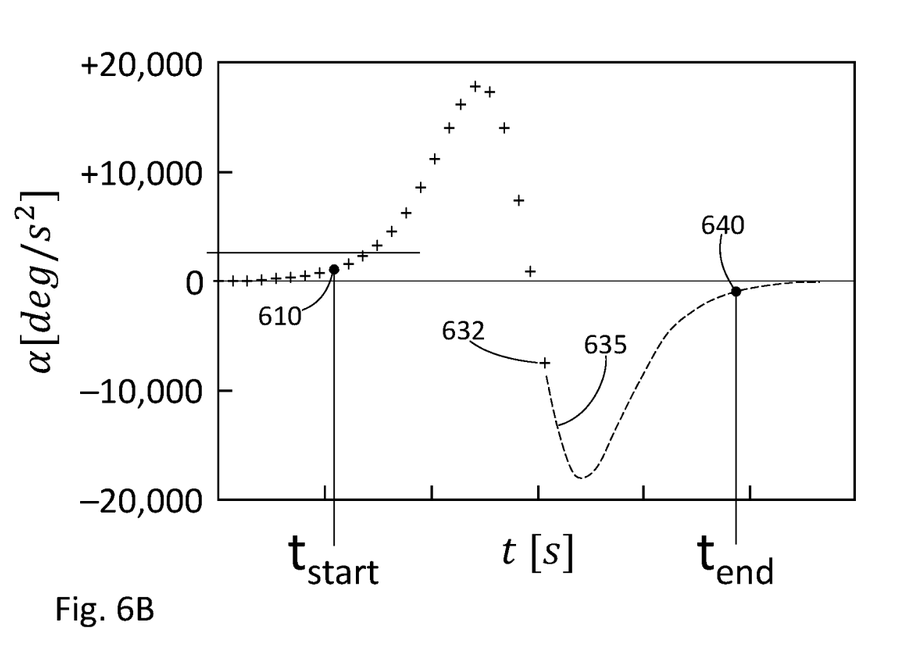
Figure 7A:
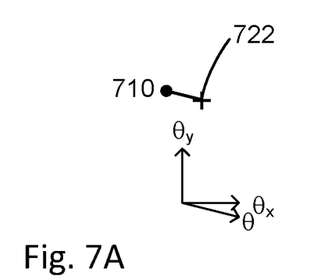
FIGS. 7A-7C are spatial diagrams of the saccade of FIG. 6.
Figure 7B:
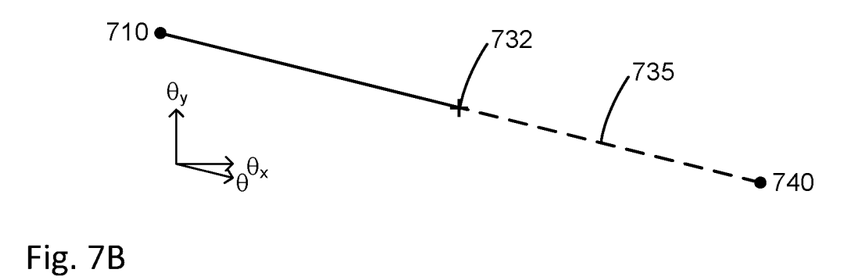
Figure 7C:
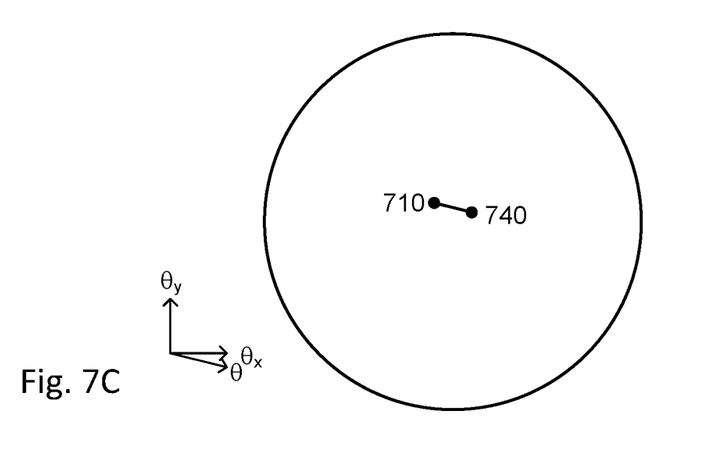

FIGS. 6A-6B are graphs of angular acceleration of the eye as a function of time, illustrating the method of FIG. 5. In FIG. 6, the +'s are the acceleration samples. FIGS. 7A-7C are spatial diagrams of the saccade of FIG. 6. FIG. 7C shows the completed saccade, from start point 710 to endpoint 740. The large circle in FIG. 7C represents the angular range of motion of the user's eye. It is a representation for purposes of illustration; the actual range of motion is oblong and asymmetric. The coordinates $\theta_x$ and $\theta_y$ represent horizontal and vertical eye rotation. In this example, the user's eye is originally gazing to the left and slightly up. During the saccade, the eye rotates to the right and slightly down. FIGS. 7A and 7B are magnified views of just the saccade, with FIG. 7A corresponding to FIG. 6A, and FIG. 7B corresponding to FIG. 6B.

In FIG. 6A, line 620 represents the threshold defining the onset of a saccade. Because saccadic motion is the fastest of the eye movements, angular accelerations above a certain threshold value indicate the onset of a saccade. In FIG. 6A, sample 622 is the first sample that exceeds the threshold. This is the trigger 522 for onset 320 of a saccade. Point 610 is the actual start point of the saccade. In the sigmoid model described above, start point 610 occurs at time $t_{start}$, which corresponds to an angular position of $\theta=ar$. This point 610 may or may not corresponding to one of the samples and the location of point 610 may not be known until after the saccade prediction is completed. In FIG. 7A, the eye has started to move towards its endpoint. Spatial position 722 corresponds to sample 622 in FIG. 6A. Since this is at the beginning of the saccade, the eye has not yet moved much.

Once onset of the saccade is detected 320, the system then looks for a zero crossing 532 of the angular acceleration curve. This is shown in FIG. 6B. Sample 632 is the first sample after the zero crossing. In FIG. 5, once the zero crossing is detected 532, the samples to date are used to curve fit 534 the parameterized function, which is used to estimate the saccade endpoint. In FIG. 6B, this is represented by the dashed line 635, which is the estimate of the remaining saccadic motion, with endpoint 640. In the sigmoid model described above, endpoint 640 occurs at time $t_{end}$, which corresponds to an angular position of $\theta=a(1-r)$. In FIG. 7B, the eye is approximately midway through the saccade at the zero crossing point 732. (Strictly speaking, point 732 corresponding to sample 632 will be slightly more than midway through the saccade.) The rest of the saccadic motion is predicted by the dashed line 735 ending at endpoint 740.

Using the example 5 degree saccade in FIG. 4A, that saccade lasts for approximately 40 ms, so the parameter "a" would be estimated based on approximately 20 samples, assuming a sampling rate of 1 sample per ms. For a 40 ms saccade, each half lasts 20 ms. If the system waits for 20 ms to collect samples for the first half and then takes less than 10 ms to calculate the curve fit and endpoint, then the endpoint prediction will be available 10 ms after reaching the midpoint of the saccade or at least 10 ms before the actual saccade ends in this example.

In this example, the plots of angular motion are with respect to θ, which is the direction of saccadic motion. However, in a real system, the sensor axes may not be aligned with the direction θ. While an arbitrary rotation may be decomposed along orthogonal axes instant by instant, the axes change continuously during the rotation. If the result of a finite rotation, e.g. a saccade end point prediction, is expressed in terms of angles around more than one axis, then one approach is to solve the problem by accounting for rotations with quaternions.

Figure 8:
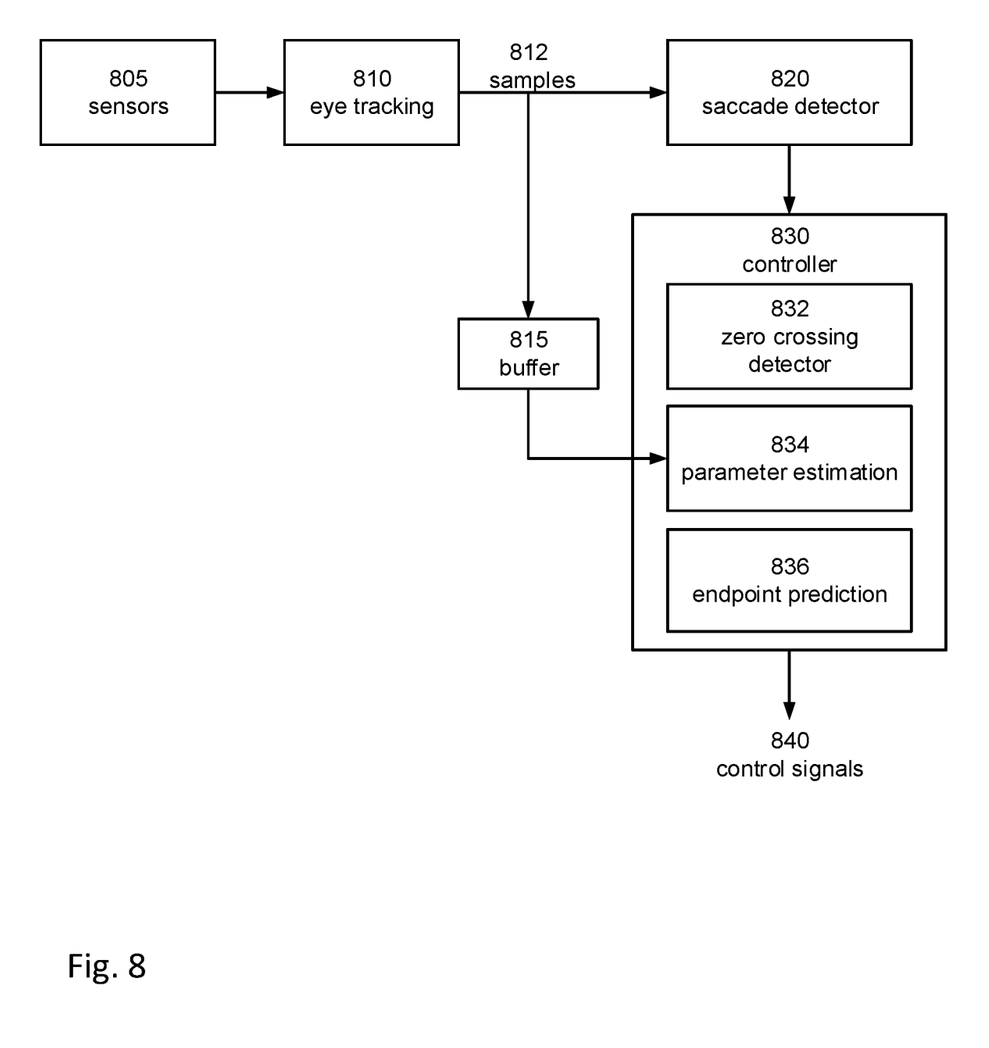
FIG. 8 is a block diagram of a system that implements the method of FIG. 5

FIG. 8 is a block diagram of a system that implements the method of FIG. 5. Sensors 805 detect the motion of the user's eye. These may include accelerometers, magnetometers and gyroscopes in the contact lens. An eye tracker 810 converts the sensor measurements into samples 812 of eye position and orientation, which in this case includes samples of angular acceleration. In FIG. 8, these samples are provided to a saccade detector 820 and they are also buffered 815. The saccade detector 820 detects onset of a saccade, based on the samples of the eye motion. A controller 830 then predicts the saccade endpoint and generates control signals 840 to take appropriate actions.

In FIG. 8, the controller 830 includes a zero crossing detector 832, a module 834 that does the curve fit to the parameterized function, and a module 836 for endpoint prediction. The zero crossing detector 832 determines 532 when the angular acceleration samples cross zero. Module 834 then determines 534 the parameters for the curve fit based on the samples of the eye motion. The curve fit may be based on samples collected before onset of the saccade was detected, retrieved from buffer 815. In this example, the parameters are used as indices into a lookup table 836 that returns the predicted endpoint: temporal duration of the saccade and/or spatial length of the saccade. Alternatively, the endpoint may be calculated 836 from the parameter values.

In one implementation, the sensors 805 are implemented on-lens and the rest of the components are off-lens. The resulting control signals may be transmitted back on-lens if the affected components are on-lens. Other divisions of the functions between on-lens and off-lens are possible. For example, if the saccade detector 820 is a threshold detector, it may be implemented on-lens, detecting whether the output from the various on-lens accelerometers exceeds a threshold. Once the threshold is exceeded, on-lens circuitry may idle the femtoprojector because the eye is in a saccade. The control signals to reactivate the femtoprojector may come from off-lens, since the saccade endpoint prediction and reengagement of the femtoprojector are more complex operations.

Figure 9:
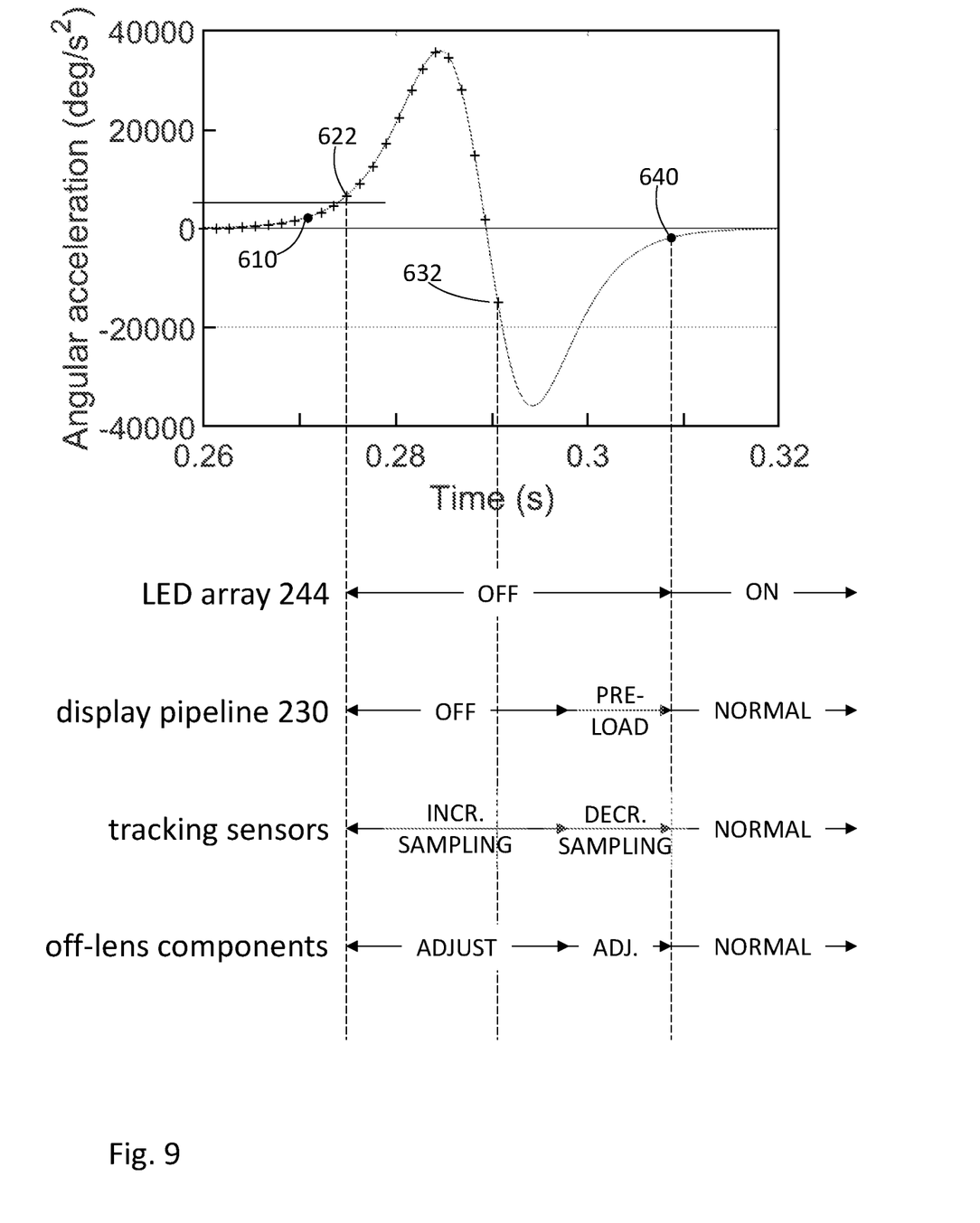
FIG. 9 is a timing diagram that illustrates modified operation of the electronic contact lens resulting from the saccade detection and prediction.

Once a saccade is detected, many actions are possible, as shown in block 340 of FIG. 5. FIG. 9 is a timing diagram that illustrates some examples of modified operation of the electronic contact lens based on the saccade detection and prediction. The top of FIG. 9 shows the angular acceleration plot from FIG. 6B. On this plot, point 622 is when the saccade is detected, point 632 or thereafter is when the endpoint prediction is available, and point 640 is the actual endpoint.

The horizontal lines beneath this time plot represent different components and how their operation may be adjusted. For example, the LED array 244 in the femtoprojector may be turned off 541 upon saccade detection 622. Saccadic suppression is a phenomenon that suppresses visual perception of images during a saccade. Thus, it may not be necessary for the femtoprojector to continue to project images onto the retina during the saccade. Turning off or otherwise idling the femtoprojector reduces on-lens power consumption. Note that the LED array may be idled upon saccade detection 622. It is not necessary to wait until endpoint prediction 632 is completed. For maximum idle time, the LED array is turned back on at the last possible moment before the saccade ends. The timing of that moment depends on the accuracy of the endpoint prediction. If the LED array is turned back on too late, images may be delayed. If the LED array is turned back on too early, there may be some unnecessary power consumption. In a simpler approach, the LED array may be idled for just a fixed period corresponding to the shortest duration saccade. Alternately, it may be idled using that initial endpoint, but extending the idle period as more accurate endpoint predictions are computed.

If the LED array 244 is not producing light, then there also is no need to operate the pipeline 230 or backplane 242 that feed the LED array. These components may also be idled 541. In FIG. 9, the display pipeline 230 is reactivated with some lead time so that images may make their way through the pipeline 230 in time to be displayed immediately at the end of the saccade.

If the femtoprojector is providing an augmented reality where computer-generated images are overlaid onto views of the external environment, these images may be preloaded 545 based on the predicted spatial endpoint of the saccade. For example, if the predicted endpoint indicates that the saccade will move the user's gaze to a specific object, the system may preload a label for that image, or produce colors, adjust brightness or otherwise change imagery because the user is now gazing at this new object. Due to the change in the user's gaze, the resolution of imagery that is now at the center of the user's gaze may be increased, while the resolution of imagery now at the periphery may be decreased. More time may be available to make these adjustments because on-going images need not be generated during the saccade period.

Other components, both on-lens and off-lens, may also be idled or otherwise reduced in operation 541 or switched 543 to a different mode of operation. For some components, their operation is reduced in order to reduce their power consumption. For example, data rates may be reduced, and brightness and/or resolution of images may be reduced. In some cases, components may switch to self-calibration or self-test modes during this idle period.

Saccades may also be an opportunity to increase the operation 542 of certain components, both on-lens and off-lens. For example, if operation of the display pipeline is reduced and therefore consumes less power, then this saved power may be used to increase the operation of components outside the display pipeline. As shown in FIG. 9, the sampling rate of the eye-tracking sensors may be increased during this temporary period and then decreased again as components in the display pipeline are reactivated.

As another example, data rates for data transmission from and to the lens may be increased 547 during the saccade period. Control or diagnostic signals from the electronic contact lens to the rest of the system may be transmitted at a higher rate.

Off-lens components may be affected correspondingly. Much of the display pipeline may be implemented off-lens. Idling the LED array, precalculating and preloading images for the predicted endpoint, and not generating images during the saccade period affects the off-lens part of the pipeline. Conversely, increasing diagnostic or calibration data or other functions also affect components that are off-lens.

For clarity, the description above was focused on one eye. Users may wear two electronic contact lenses, one for each eye. These may be coordinated since the saccades for right and left eyes are coordinated. For example, the saccade detection and endpoint prediction may be based on motion measurements from one eye, or from both eyes. As another example, the endpoint prediction for both eyes may be checked for consistency or may be made together to ensure consistency. As a final example, once a saccade is detected, the operation of components for both electronic contact lenses may be adjusted.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method for operating an electronic contact lens that contains a femtoprojector, the femtoprojector projecting images onto a user's retina, the method comprising:
   detecting onset of a saccade based on motion of the user's eye;
   during the saccade, predicting an endpoint of the saccade comprising:
      taking samples of the motion of the user's eye;
      fitting the samples to a parameterized function for saccadic motion, wherein the parameterized function is based on a sigmoid function for angular position of the user's eye, the parameterized function is symmetric with respect to a midpoint of the saccade and the symmetric parameterized function includes a first half and a second half;
      detecting completion of the first half, wherein detecting completion of the first half comprises detecting a zero crossing for angular acceleration of the user's eye; and
      predicting the endpoint of the saccade based on samples of the motion during the first half, wherein predicting the endpoint of the saccade is further based on predicting the midpoint of the saccade and based on the symmetry of the first half and the second half around the midpoint; and
   adjusting operation of the electronic contact lens based on the predicted endpoint of the saccade.

2. The method of claim 1 wherein detecting onset of the saccade comprises detecting acceleration or jerk of the user's eye exceeding a threshold.

3. The method of claim 1 wherein the samples are samples of angular acceleration of the user's eye.

4. The method of claim 1 wherein the samples are samples of angular velocity of the user's eye.

5. The method of claim 1 wherein parameters for the sigmoid function include an amplitude of the sigmoid function.

6. The method of claim 1 wherein parameters for the parameterized function account for differences in saccadic motion between different users.

7. The method of claim 1 wherein predicting the endpoint of the saccade further comprises:
   buffering samples of the motion of the user's eye; and
   predicting the endpoint based on buffered samples taken before onset of the saccade was detected.

8. The method of claim 1 wherein fitting the samples to the parameterized function begins after reaching a midpoint of the saccade and predicting the endpoint of the saccade is completed within ten ms after reaching the midpoint of the saccade.

9. The method of claim 1 wherein fitting the samples to the parameterized function comprises making a series of two or more fittings of increasing precision as more samples of the user's eye motion are taken.

10. The method of claim 1 wherein predicting the endpoint of the saccade comprises using a lookup table to predict the endpoint.

11. The method of claim 1 wherein adjusting operation of the electronic contact lens comprises:
   adjusting operation of both a right-eye electronic contact lens and of a left-eye electronic contact lens based on the predicted endpoint of the saccade.

12. The method of claim 1 wherein detecting onset of the saccade and/or predicting the endpoint of the saccade are based on motion of both of the user's eyes.

13. An eye-mounted display system comprising:
   an electronic contact lens that is mountable on a user's eye, wherein the electronic contact lens contains a femtoprojector that projects images onto a user's retina;
   a saccade detector that detects onset of a saccade based on motion of the user's eye; and
   a controller that: during the saccade, predicts an endpoint of the saccade comprising:
      taking samples of the motion of the user's eye;
      fitting the samples to a parameterized function for saccadic motion, wherein the parameterized function is based on a sigmoid function for angular position of the user's eye, the parameterized function is symmetric with respect to a midpoint of the saccade and the symmetric parameterized function includes a first half and a second half;
   detecting completion of the first half, wherein detecting completion of the first half comprises detecting a zero crossing for angular acceleration of the user's eye; and
   predicting the endpoint of the saccade based on samples of the motion during the first half, wherein predicting the endpoint of the saccade is further based on predicting the midpoint of the saccade and based on the symmetry of the first half and the second half around the midpoint; and
   adjusts operation of the electronic contact lens based on the predicted endpoint of the saccade.

14. The eye-mounted display system of claim 13 wherein the electronic contact lens further contains sensors that measure the motion of the user's eye.

15. The eye-mounted display system of claim 13 wherein the electronic contact lens comprises a scleral contact lens containing the femtoprojector.

* * * * *